(12) United States Patent
Diaz

(10) Patent No.: US 10,348,092 B1
(45) Date of Patent: Jul. 9, 2019

(54) ELECTRICAL POWER DISTRIBUTION CONTROL DEVICE

(71) Applicant: Noel Diaz, Arecibo, PR (US)

(72) Inventor: Noel Diaz, Arecibo, PR (US)

(*) Notice: Subject to any disclaimer, the term of this patent is extended or adjusted under 35 U.S.C. 154(b) by 536 days.

(21) Appl. No.: 15/000,142

(22) Filed: Jan. 19, 2016

(51) Int. Cl.
*H02J 7/00* (2006.01)
*H02J 9/00* (2006.01)
*H02J 3/38* (2006.01)
*H02J 9/06* (2006.01)

(52) U.S. Cl.
CPC .............. *H02J 3/383* (2013.01); *H02J 3/386* (2013.01); *H02J 9/061* (2013.01)

(58) Field of Classification Search
CPC ............. H02J 3/383; H02J 3/386; H02J 9/061
USPC .......................................................... 307/65
See application file for complete search history.

(56) References Cited

U.S. PATENT DOCUMENTS

| | | | |
|---|---|---|---|
| 5,999,888 A | 12/1999 | Aubee | |
| 7,155,912 B2 | 1/2007 | Enis | |
| 8,903,560 B2 | 12/2014 | Miller | |
| 8,975,779 B2 | 3/2015 | Cooper et al. | |
| 2007/0005195 A1 | 1/2007 | Pasquale | |
| 2011/0060474 A1 | 3/2011 | Schmiegel | |
| 2013/0169064 A1* | 7/2013 | Park | H02J 3/28 307/112 |
| 2015/0015075 A1* | 1/2015 | Toya | H02J 9/06 307/66 |
| 2015/0200559 A1* | 7/2015 | Im | H02J 7/0022 307/18 |
| 2016/0211670 A1* | 7/2016 | Nakayama | H02J 3/383 |

FOREIGN PATENT DOCUMENTS

WO    WO2008125696 A2    10/2008

* cited by examiner

*Primary Examiner* — Richard Tan

(57) ABSTRACT

The electrical power distribution control device controls the flow of electricity between the electric grid and one or more alternate sources, including, but not limited to, back-up generators, photovoltaic cells or wind turbines. The electrical power distribution control device monitors the status of the one or more alternate sources, an optional battery, and the electric grid and switches and balances the electric load between the one or more alternate sources and the electric grid to minimize power costs. The electrical power distribution control device comprises a controller, a plurality of relays, and a plurality of sensors.

2 Claims, 5 Drawing Sheets

ELECTRICAL POWER DISTRIBUTION CONTROL DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of distribution of electrical power, more specifically, a distribution device for managing electrical consumption from on grid and off grid sources.

SUMMARY OF INVENTION

The electrical power distribution control device controls the flow of electricity between the electric grid and one or more alternate sources, including, but not limited to, back-up generators, photovoltaic cells or wind turbines. The electrical power distribution control device monitors the status of the one or more alternate power sources, an optional battery, and the electric grid and switches the electric load between the one or more alternate sources and the electric grid to minimize power costs.

These together with additional objects, features and advantages of the electrical power distribution control device will be readily apparent to those of ordinary skill in the art upon reading the following detailed description of the presently preferred, but nonetheless illustrative, embodiments when taken in conjunction with the accompanying drawings.

In this respect, before explaining the current embodiments of the electrical power distribution control device in detail, it is to be understood that the electrical power distribution control device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrical power distribution control device.

It is therefore important that the claims be regarded as including such equivalent construction insofar as they do not depart from the spirit and scope of the electrical power distribution control device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
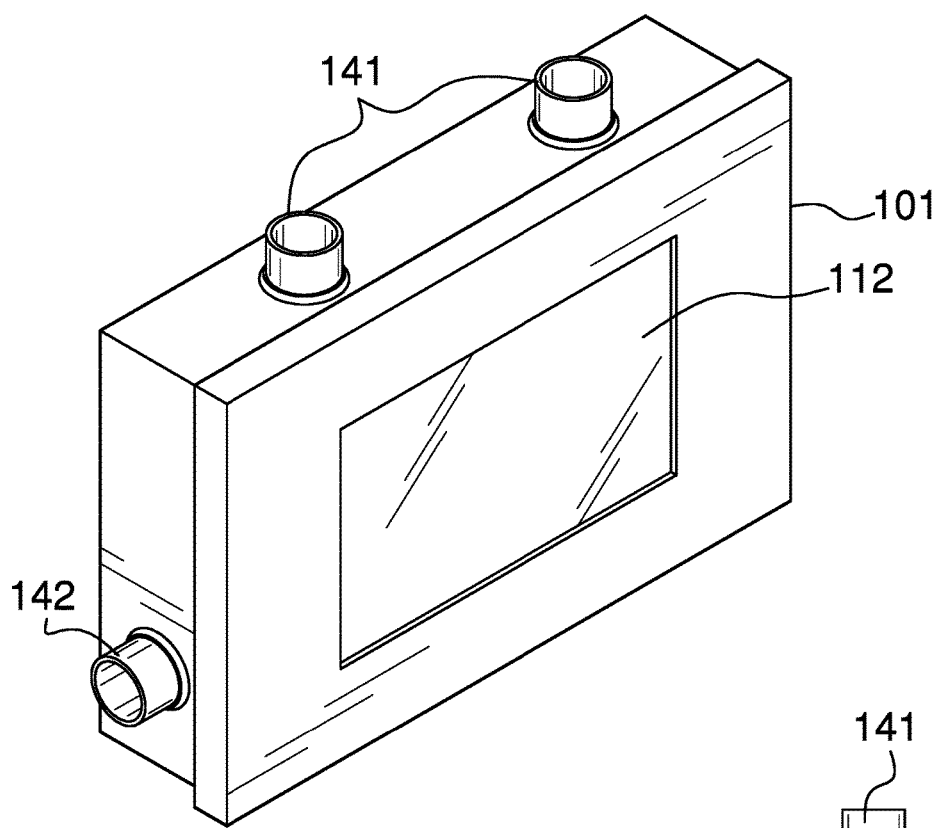
FIG. 1 is a perspective view of an embodiment of the disclosure.
Figure 2:
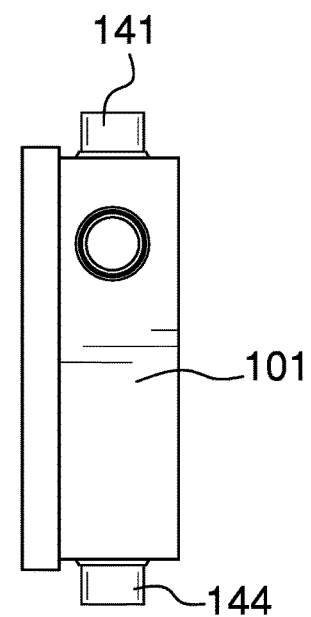
FIG. 2 is a side view of an embodiment of the disclosure.
Figure 3:
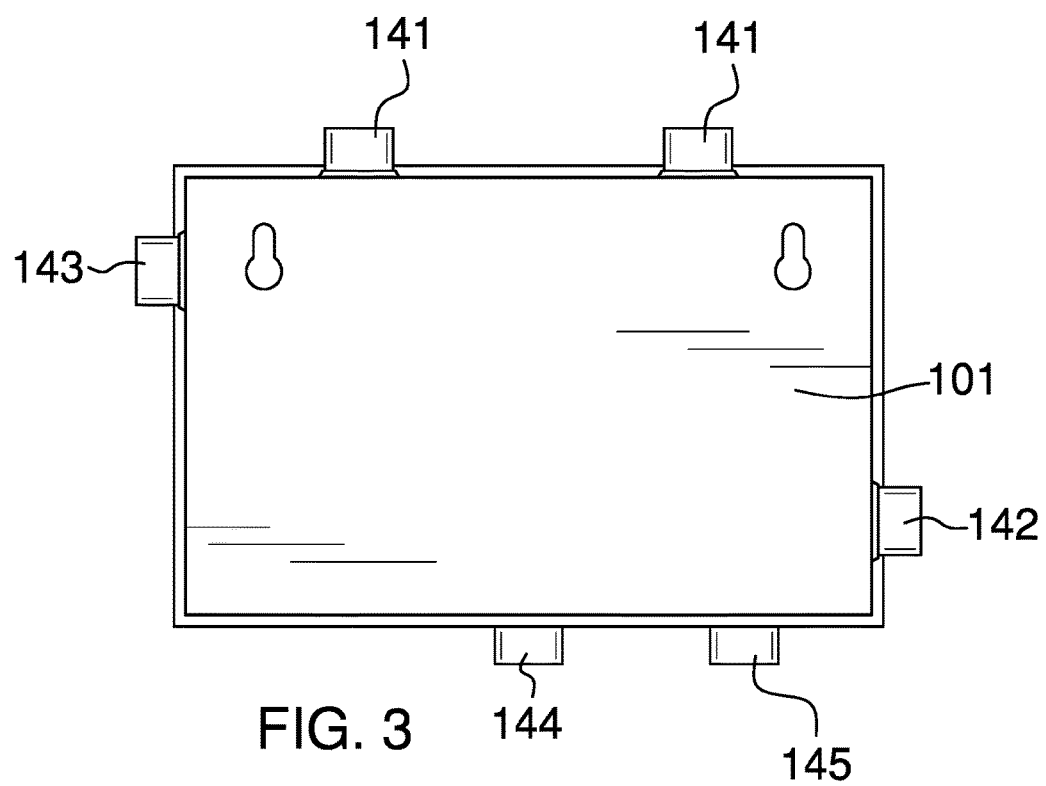
FIG. 3 is a back view of an embodiment of the disclosure.
Figure 4:
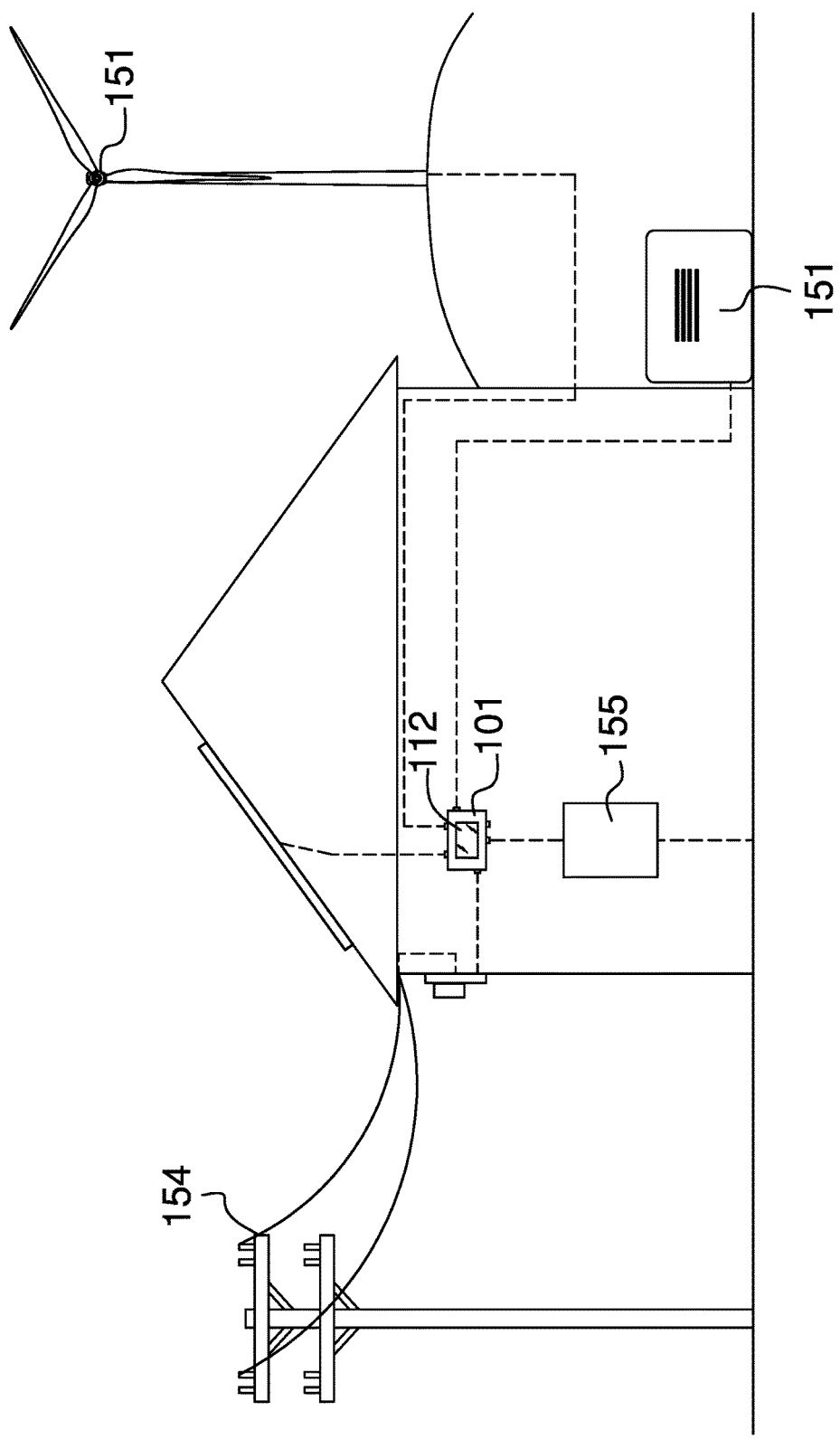
FIG. 4 is an in use view of an embodiment of the disclosure.
Figure 5:
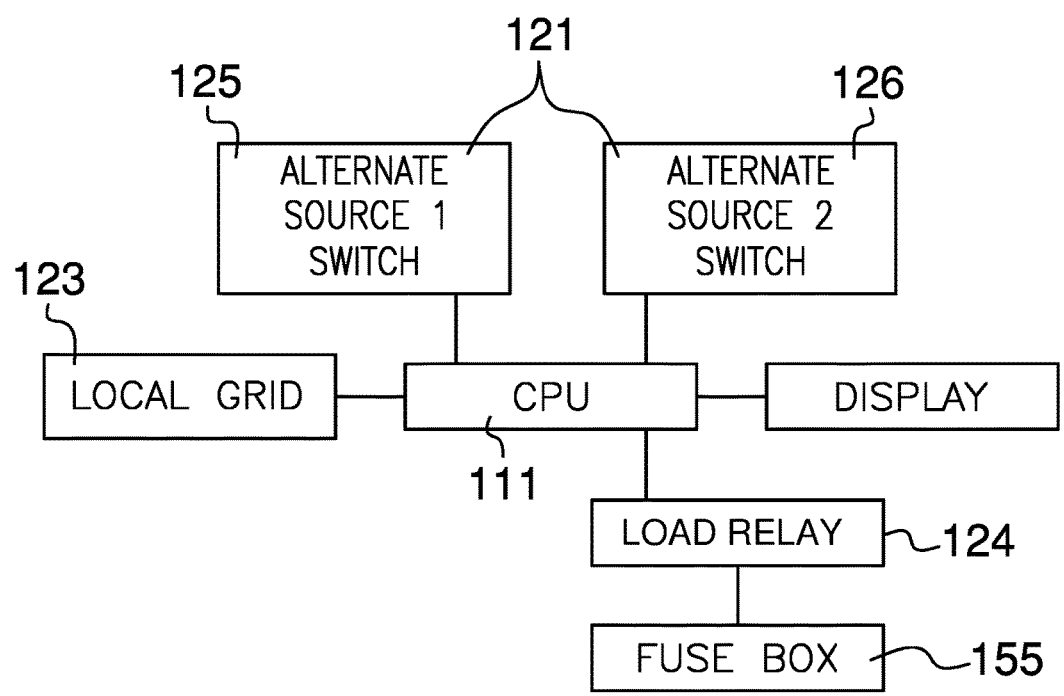
FIG. 5 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6.

The electrical power distribution control device 100 (hereinafter invention) comprises a controller 101, a plurality of relays 102, and a plurality of sensors 103. The invention 100 is adapted for use with one or more alternate sources 151, a grid tie inverter 152, a battery 153, the national electric grid 154, and a circuit breakers 155. The invention 100 controls the flow of electricity from the electric grid 154 and one or more alternate sources 151, including, but not limited to, back-up generators, photovoltaic cells or wind turbines. The invention 100 monitors the status of the one or more alternate sources 151, an optional battery 153, and the electric grid 154 and switches and balances the electric load between the one or more alternate sources 151 and the electric grid 154 to support the electric load and maintain electrical reserves with minimal electricity consumption from the electric grid 154.

At its core, the invention 100 is a switching device that senses the availability and status of the one or more alternate sources 151, the electric grid 154, and, optionally, the battery 153 and, through the settings of the plurality of relays 102, routes electricity from a combination of the one or more alternate sources 151, the electric grid 154, and, the optional battery 153 to circuit breakers 155 that supply the electricity required by the electric load serviced by the circuit breakers 155. The algorithm to select the combination of the one or more alternate sources 151, the electric grid 154, and, the optional battery 153 used to supply electricity to the circuit breakers 155 is programmable and adjustable.

The controller 101 further comprises a logic module 111, a display 112, and a plurality of input and output signals 113. The logic module 111 is a programmable device that is used to control and operate the controller 101. The display 112 is a visual display that is controlled by the logic module 111. In the first potential embodiment of the disclosure, the display 112 is used to display operating information about the invention 100 while the invention 100 is in use. In a second potential embodiment of the disclosure, the display 112 is a commercially available touch screen display can be used to direct the operation of the invention 100 through the logic module 111. The plurality of input and output signals 113 are the interfaces that: 1) receive a first set of signals from one or more sensors selected from the plurality of sensors 103; 2) transfers the first set of signals to the logic module 111; 3) receives a second set of signals from the logic module 111; and, 4) transfers the second set of signals to one or more relays selected from the plurality of relays 102.

Each individual relay selected from the plurality of relays 102 is used to complete an electrical circuit that will be described in this paragraph. The controller 101 controls the opening and closing of each individual relay selected from the plurality of relays 102 through the plurality of input and output signals 113. The plurality of relays 102 further comprises a plurality of alternate source relays 121, a grid tie inverter relay 122, an electric grid relay 123, and a load relay 124. As shown most clearly, each of the plurality of alternate source relays 121 is used to complete the electrical circuit connection from an alternate source selected from the one or more alternate sources 151 to both the grid tie inverter 152, and, if it is used in the system, the battery 153. The battery 153 is discussed in more detail elsewhere in this disclosure. The grid tie inverter relay 122 is used to complete the electrical circuit connection from the grid tie inverter relay 122 to both the load relay 124 and the electric grid relay 123. The electric grid relay 123 is used to complete the electrical circuit connection from the electric grid 154 to both the load relay 124, and the grid tie inverter relay 122. The load relay 124 is used to complete the electrical circuit connection from the both the electric grid relay 123 and the grid tie inverter relay 122 to the circuit breakers 155. The operation of the plurality of relays 102 is discussed elsewhere in this disclosure.

Each individual sensor selected from the plurality of sensors 103 measures the status, such as electrical output or capacity, of key elements of the system and provides this measurement as an electrical signal through the plurality of input and output signals 113 to the logic module 111. The logic module 111 uses the electrical signals received from each of the plurality of sensors 103 as inputs to the algorithm. The plurality of sensors 103 further comprises a plurality of alternate source sensors 131, a battery sensor 132, and an electric grid sensor 133. Each of the plurality of alternate source sensors 131 measures the status of an alternate source selected from the one or more alternate sources 151. The battery sensor 132 provides a measure of the amount of energy stored in the battery 153. The battery 153 is an optional energy storage device that may or may not be provided as part of the system the invention 100 is used with. When the battery 153 is omitted from the system, the removal of the battery sensor 132 from the system will have no operational effect on the invention 100. The electric grid sensor 133 measures the status of the electric grid 154.

Figure 6:
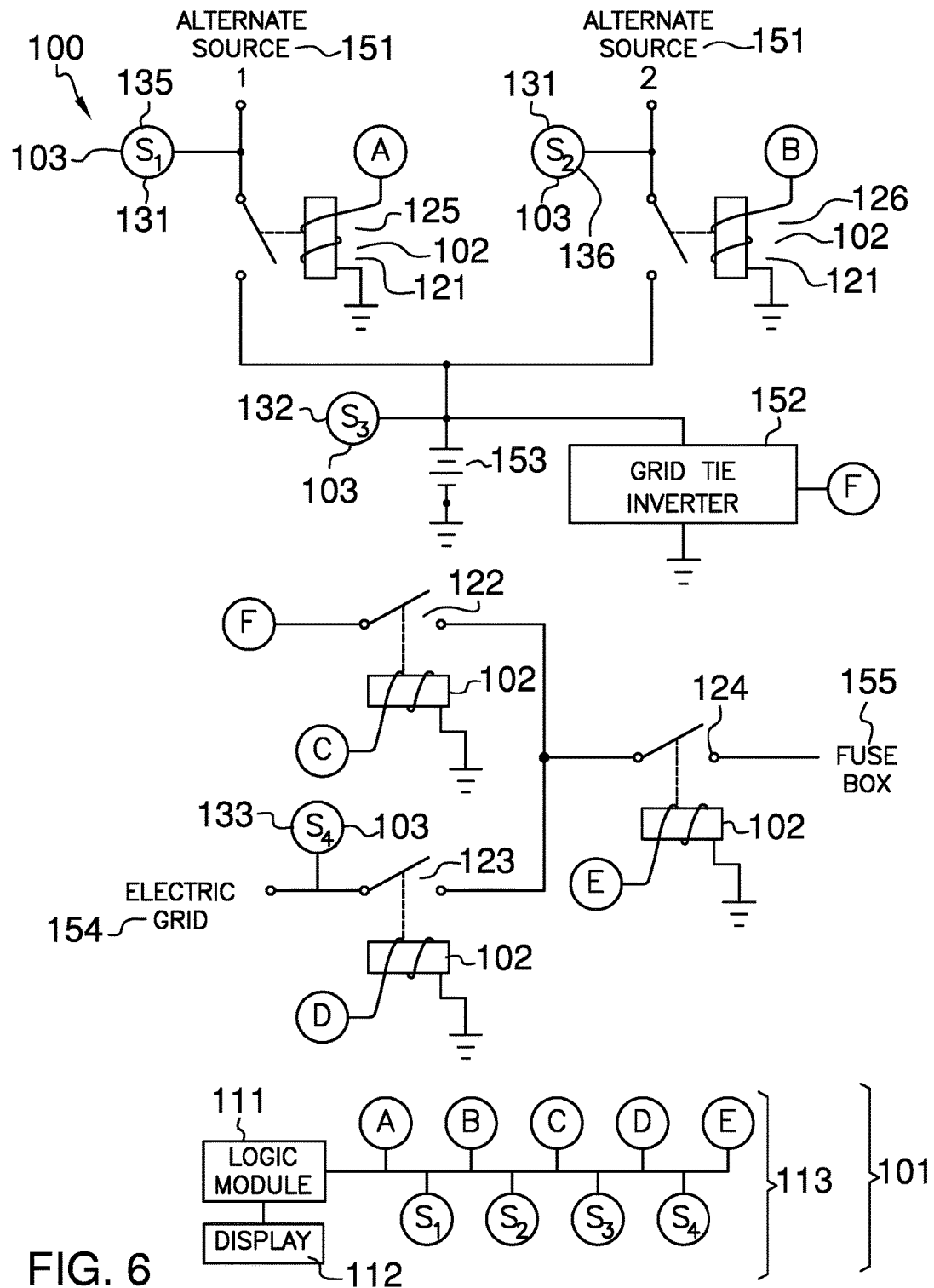
FIG. 6 is a schematic view of an embodiment of the disclosure.

In the first potential embodiment of the disclosure, as shown in FIG. 6, the plurality of alternate source relays 121 further comprises a first alternate source relay 125 and a second alternate source relay 126. In the first potential embodiment of the disclosure, the plurality of alternate source sensors 131 further comprises a first alternate source sensor 135 and a second alternate source sensor 136.

The operation of the first and the second potential embodiment of the disclosure are defined by the opening and closing of the plurality of relays 102. The controller 101 determines the required status of each of the plurality of relays 102 through the inputs provided through the plurality of sensors 103 as processed by the algorithm. In normal operation, the load relay 124 is closed so that electricity supplies the electrical load through the circuit breakers 155. The load relay 124 is opened when maintenance to the circuit breakers 155 or the electrical load required disconnection from the electrical source. The grid tie inverter relay 122 is closed when it is determined by the controller 101 that electrical power should be provisioned by one or more of the alternate sources 151. In instances where the one or more alternate sources 151 can fully provision the electric load the electric grid relay 123 is open.

In instances wherein the one or more alternate sources 151 cannot fully provision the electric load the electric grid relay 123 is closed to allow the electric grid 154 to supplement the provisioning of electricity. If the controller 101 and the plurality of sensors 103 are measuring the capacity of the battery 153, the algorithm can be configured to maintain a minimum energy reserve within the battery 153 for emergency or other purposes. In this situation, the grid tie inverter relay 122 can be opened and the electric grid relay 123 can be closed such that the electric grid 154 fully provisions the electric load. Optionally, if the controller 101 and the plurality of sensors 103 are measuring the capacity of the battery 153, the algorithm can be configured to provision the electric grid 154 from the one or more alternate sources 151 when: 1) the energy reserve stored within the battery 153 is greater than a predetermined level; and, 2) the available output from the one or more alternate sources 151 is greater than the requirements relay 123 and the grid tie inverter relay 122 are simultaneously closed. The controller 101 will close the relay of an alternate source selected from the one or more of alternate sources 151 when measurements provided by the plurality of input and output signals 113 meet thresholds programmed into the algorithm. It is possible for more than one relay selected from the plurality of relays 102 to be closed simultaneously.

The architecture of the second potential embodiment of the disclosure is identical to the architecture of the first potential embodiment of the disclosure. However, as shown in FIGS. 1 through 4, all the components of the invention 100, including the controller 101, the plurality of relays 102, and the plurality of sensors 103 are stored in a single housing 140. In order to complete the wiring, the housing contains a plurality of alternate sources ports 141, an electric grid port 142, a load port 143, a battery port 144 and a grid tie inverter port 145. These ports are used to make the required connection to the plurality of alternate sources 151, the electric grid 154, the circuit breakers 155, the battery 153, and the grid tie inverter 152 as discussed above.

With the exception of the algorithm, all the components described in this disclosure are commercially available. Methods to create and implement algorithms are well known and documented in the art.

The following definitions were used in this disclosure:

As used in this disclosure, AC an acronym for alternating current.

Alternate Source: In this disclosure, an alternate source is an external electrical power source other than the national electric grid. Alternate sources include, but are not limited to fuel powered electric generators as well as electric generators that use wind power, solar power or geothermal power as their energy source.

Battery: As used in this disclosure, a battery is a container consisting of one or more cells, in which chemical energy is converted into electricity and used as a source of power.

DC: As used in this disclosure, DC an acronym for direct current.

Grid Tie Inverter: As used in this disclosure, a grid tie inverter is an electric device that converts dc electricity into ac electricity that is synchronized with a national electric grid.

Logic Module: As used in this disclosure, a logic module is a programmable device that accepts digital and analog inputs, processes the digital and analog inputs according to previously stored instruction and to provide the results of these instructions as digital or analog outputs.

Photovoltaic Cell: As used in this disclosure, a photovoltaic cell is an electrical device that directly converts light energy into electrical energy.

Relay: As used in this disclosure, a relay is an automatic electromagnetic or electromechanical device that reacts to changes in voltage or current by opening or closing a switch in an electric circuit.

Sensor: As used in this disclosure, a sensor is a device that receives and responds in a predetermined way to a signal or stimulus.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device comprising:
a controller, a plurality of relays, and a plurality of sensors;
wherein the device is adapted for use with a one or more alternate sources;
wherein the device is adapted for use with a grid tie inverter;
wherein the device is adapted for use with a national electric grid;
wherein the device is adapted for use with circuit breakers;
wherein the device controls a flow of electricity from the national electric grid and said one or more alternate sources;
wherein the device monitors a status of the one or more alternate sources and the electric grid and switches and balances an electric load between the one or more alternate sources and the electric grid;
wherein the device prevents a flow of electricity from the one or more alternate sources to the electric grid;
wherein the controller further comprises a logic module and a display;
wherein the controller further comprises a plurality of input and output signals;
wherein the plurality of input and output signals comprises interfaces that receive a first set of signals from one or more sensors selected from the plurality of sensors;
wherein the plurality of input and output signals further comprises interfaces that transfer the first set of signals to the logic module;
wherein the plurality of input and output signals further comprises interfaces that receive a second set of signals from the logic module;
wherein the plurality of input and output signals further comprises interfaces that transfer the second set of signals to one or more relays selected from the plurality of relays;
wherein the controller controls an opening and closing of each individual relay selected from the plurality of relays;
wherein the plurality of relays further comprises a plurality of alternate source relays, a grid tie inverter relay, an electric grid relay, and a load relay;
wherein each of the plurality of alternate source relays is used to complete an electrical circuit connection from an alternate source selected from the one or more alternate sources to the grid tie inverter;
wherein the grid tie inverter relay completes an electrical circuit connection from the grid tie inverter to both the load relay and the electric grid relay;
wherein the electric grid relay completes an electrical circuit connection from the national electric grid to both the load relay, and the grid tie inverter relay;
wherein the load relay is used to complete the electrical circuit connection from the both the electric grid relay and the grid tie inverter relay to the circuit breakers;
wherein the plurality of sensors further comprises a plurality of alternate source sensors and an electric grid sensor;
wherein the controller, the plurality of relays and the plurality of sensors are all contained in a single housing;
wherein the plurality of alternate source relays further comprises a first alternate source relay and a second alternate source relay;
wherein the plurality of alternate source sensors further comprises a first alternate source sensor and a second alternate source sensor.

2. A device comprising:
a controller, a plurality of relays, and a plurality of sensors;
wherein the device is adapted for use with a one or more alternate sources;
wherein the device is adapted to work with a battery;
wherein the device is adapted for use with a grid tie inverter;
wherein the device is adapted for use with a national electric grid;
wherein the device is adapted for use with circuit breakers;

wherein the device controls a flow of electricity from the national electric grid and said one or more alternate sources;

wherein the device monitors a status of the one or more alternate sources and the electric grid and switches and balances an electric load between the one or more alternate sources and the electric grid;

wherein the device prevents a flow of electricity from the one or more alternate sources to the electric grid;

wherein the battery stores energy from the one or more alternate sources for future distribution;

wherein the controller further comprises a logic module and a display;

wherein the controller further comprises a plurality of input and output signals;

wherein the plurality of input and output signals comprises interfaces that receive a first set of signals from one or more sensors selected from the plurality of sensors;

wherein the plurality of input and output signals further comprises interfaces that transfer the first set of signals to the logic module;

wherein the plurality of input and output signals further comprises interfaces that receive a second set of signals from the logic module;

wherein the plurality of input and output signals further comprises interfaces that transfer the second set of signals to one or more relays selected from the plurality of relays;

wherein the controller controls an opening and closing of each individual relay selected from the plurality of relays;

wherein the plurality of relays further comprises a plurality of alternate source relays, a grid tie inverter relay, an electric grid relay, and a load relay;

wherein each of the plurality of alternate source relays is used to complete an electrical circuit connection from an alternate source selected from the one or more alternate sources to both the battery and the grid tie inverter;

wherein the grid tie inverter relay completes an electrical circuit connection from the grid tie inverter to both the load relay and the electric grid relay;

wherein the electric grid relay completes an electrical circuit connection from the national electric grid to both the load relay, and the grid tie inverter relay;

wherein the load relay is used to complete the electrical circuit connection from the both the electric grid relay and the grid tie inverter relay to the circuit breakers;

wherein the plurality of sensors further comprises a plurality of alternate source sensors, an electric grid sensor, and a battery sensor;

wherein the controller, the plurality of relays and the plurality of sensors are all contained in a single housing;

wherein the plurality of alternate source relays further comprises a first alternate source relay and a second alternate source relay;

wherein the plurality of alternate source sensors further comprises a first alternate source sensor and a second alternate source sensor.

* * * * *